June 23, 1953 E. A. LASKEY 2,643,114
MULTIPLE AUTOGRAPHIC REGISTER
Filed March 15, 1949 3 Sheets-Sheet 1
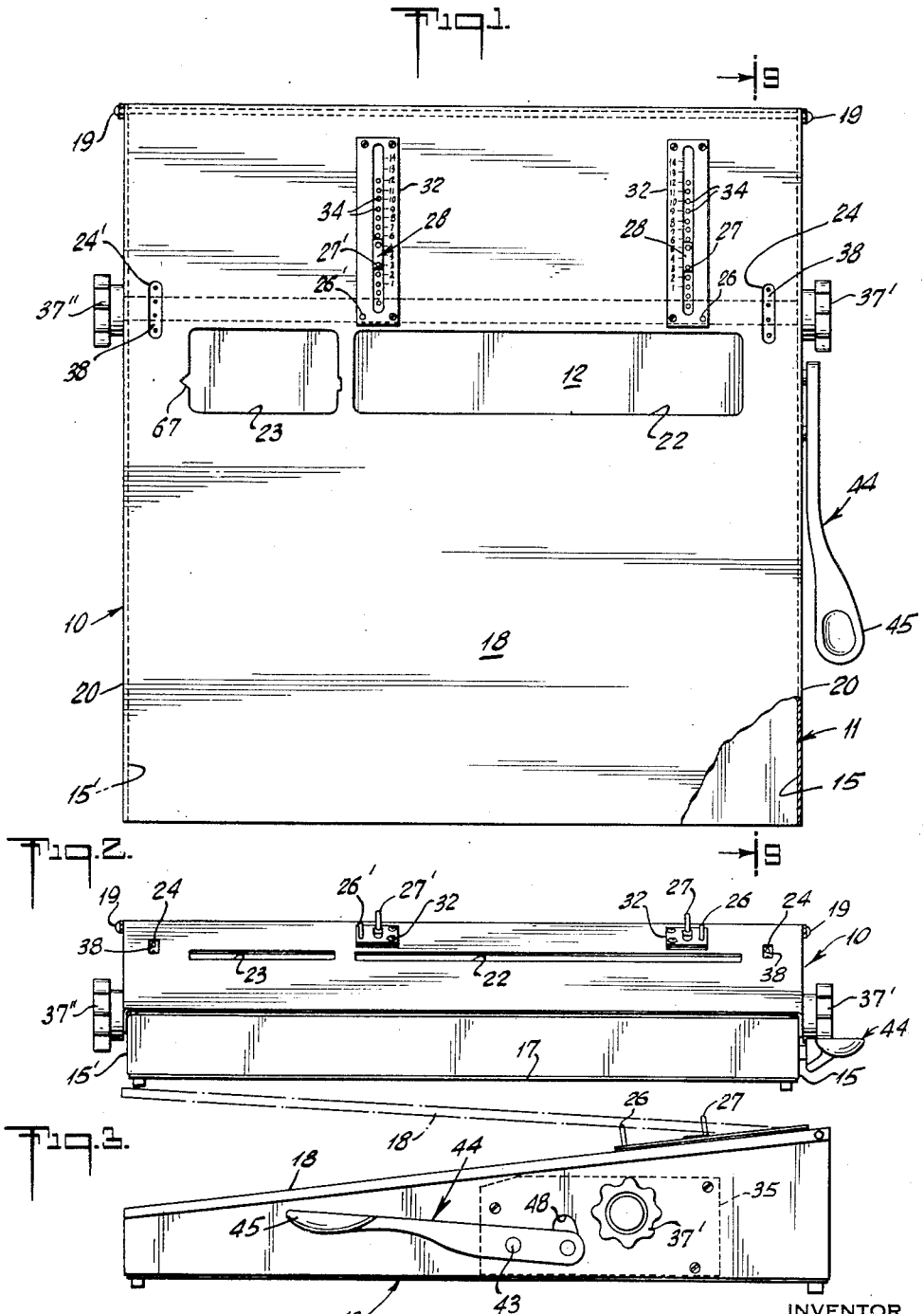
INVENTOR
ELLIS A. LASKEY
BY
ATTORNEY

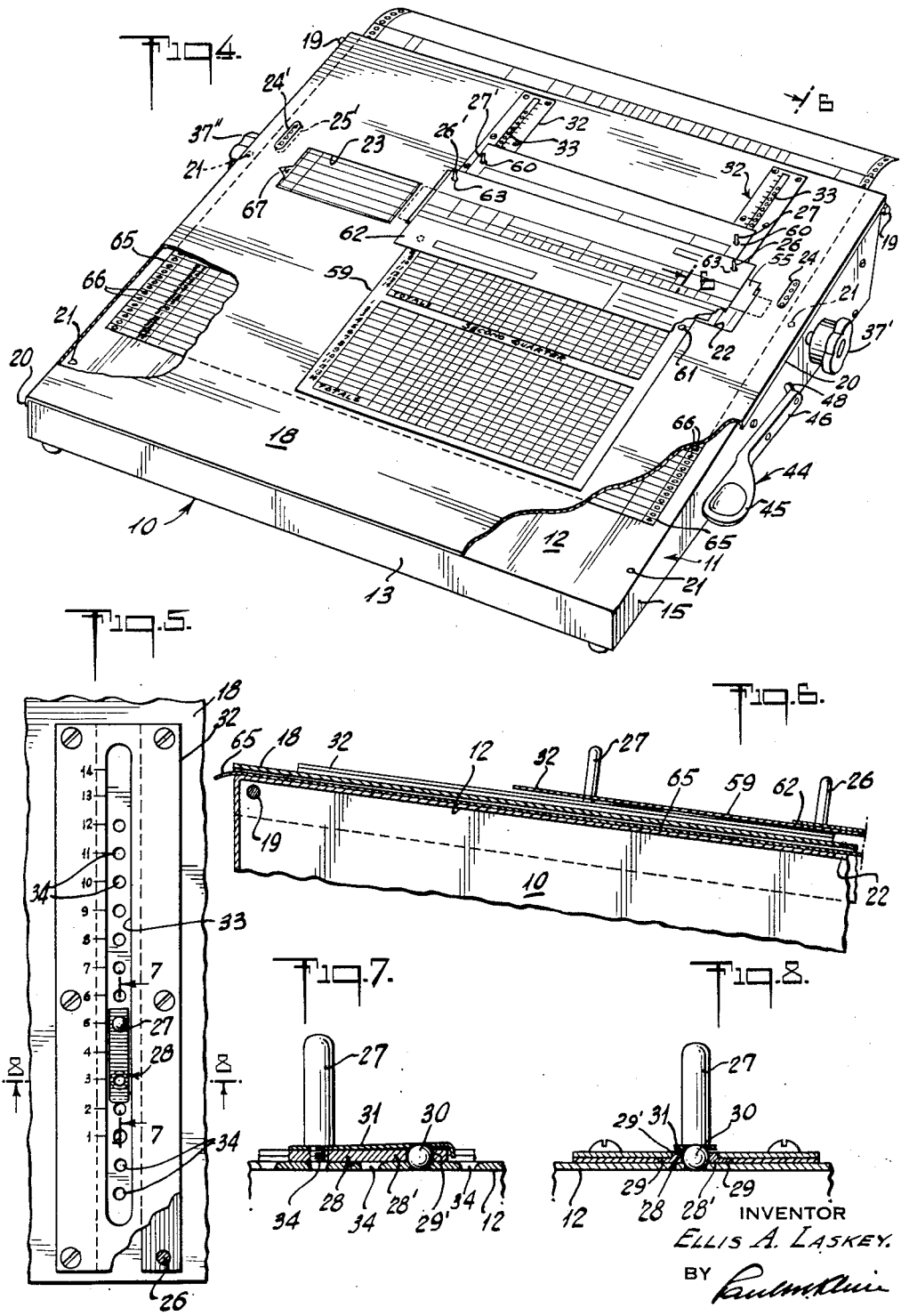

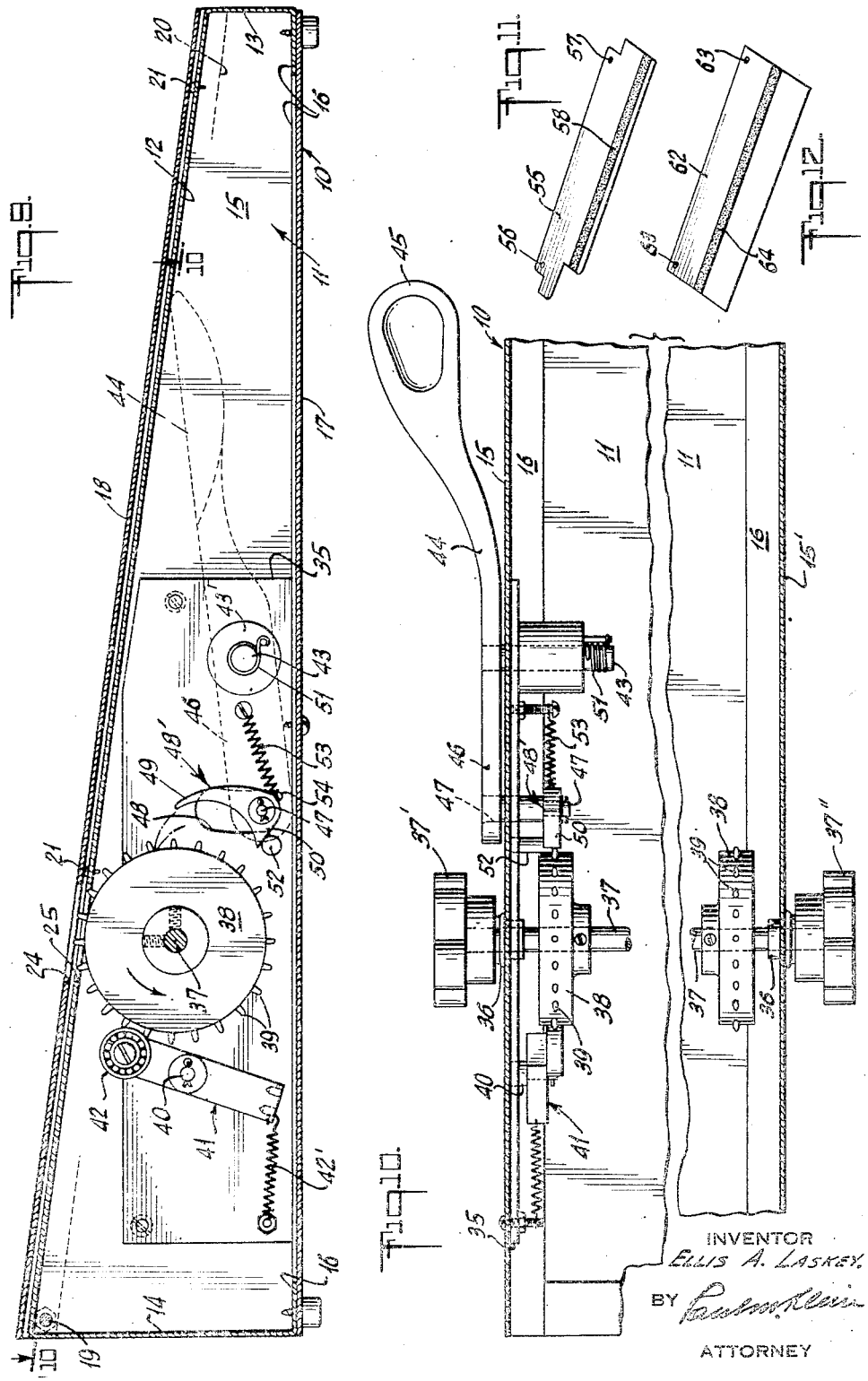

Patented June 23, 1953

2,643,114

UNITED STATES PATENT OFFICE 2,643,114

MULTIPLE AUTOGRAPHIC REGISTER

Ellis A. Laskey, Lawrence, N. Y.

Application March 15, 1949, Serial No. 81,593

4 Claims. (Cl. 271—2.4)

The present invention relates broadly to devices for producing simultaneously at a single writing operation a multiplicity of autographic records upon a plurality of writing matter items of different sizes and serving for different purposes.

Devices of the type indicated may be found most useful in numerous businesses and other lines of endeavor and may be adapted for any desired application without the requirement of material changes in its structure and in the writing items to be employed.

Thus, for example, a device of the aforesaid character is eminently suited for payroll accounting, and in order to facilitate the understanding of the working principle, the purpose and the arrangement of the principal features of the present disclosure, representative embodiments of a machine and of typical writing matter items applicable for payroll accounting will be dealt with hereinafter, without any intent whatsoever to limit thereby in any way the underlying scope of this invention.

In the simplest form of payroll accounting it is the accepted practice to maintain a general record of all employees in an establishment, upon which general record are entered various notations relating to their work and their earnings. In addition to the general record, a personal record for each employee is kept containing, besides all notation entered on the general record, a number of other important figures and information specific to the employee.

At payday each employee receives either a check or cash in payment of his earnings accompanied by a statement of such earnings. When paid by check, such statement is usually made a part thereof. When cash payment is made, the statement of earnings is either noted upon a slip or upon the envelope containing the pay.

As is evident from the aforedescribed example of the simplest form of payroll accounting, there are at least three specific forms to be filled out for each employee on each payday, amounting to a good deal of work.

It is the general object of this invention to provide means in the form of a machine and in the form of appropriate writing matter items applicable for the use with such machine to simplify the work of making a multiplicity of individual autographic records upon forms of different sizes and for different uses by producing individual records upon such machine with the use of such writing matter items simultaneously at a single writing operation, which single writing operation constitutes one of a plurality of successive writing periods, such as would be required, for example, in making all entries upon a general payroll record for all employees of an establishment.

More specific objects of the present invention are the provision of an autographic registering device and of a plurality of writing items or forms of different sizes and for different purposes, which latter, when placed upon the device in a predetermined order may be subjected to but a single graphic impression during one of a series of writing periods, whereby all of the items or forms receive such impression simultaneously, and which device is provided with several types of item-locating means, some being fixed, others being manually and bodily movable and still others being operative either automatically or non-automatically.

Still other objects of this invention are the provision of a machine and of a plurality of writing matter items or forms for use with the machine, the latter comprising a substantially closed cabinet, the inclined top of which serving as a support for such writing items or forms, and with which cabinet is operatively associated a cover-like element adapted to normally overlay the cabinet top, but which may be swung upwards in respect thereto for facilitating the placement of one of the writing forms upon the cabinet top and beneath the element, and in which element is arranged a plurality of aligned writing apertures, extending longitudinally in respect to said cabinet top, and providing writing access to certain portions of said one writing form; and in which cabinet is housed an operative instrumentality for moving said one writing form between the cabinet top and said element either by automatically advancing it in one direction to successive positions for a successive number of writing operations, or non-automatically changing its position in either of two directions; and wherein additional writing matter items are provided which are designed for use in superimposed position in respect to said element and in respect to said one writing form so that a certain substantial area of each of these additional items coincides with a corresponding area of said one writing item when the latter reaches a position beneath one of the writing apertures in said element; and wherein fixed and manually adjustable locating means are provided at the upper surface of the element, offset relative to said one writing aperture, said fixed locating means serving for holding at one and the same position at least one of the additional writing items during one of a plurality of successive writing periods to which some of the items are to be subjected, while said adjustable locating means are designed for engagement by another of the additional writing items, and to facilitate the bodily, manual movement of that item to successive positions for a successive number of writing periods.

Another object of the present invention is the provision of a machine of the character indicated for the employment of and in conjunction with a plurality of writing matter items or forms having different shapes, sizes and applications or uses, and which machine is designed to facilitate the simultaneous entry of a written intelligence upon all forms during one of a series of writing periods, and which machine is equipped with means for automatically advancing or feeding one of the forms for each of a predetermined number of writing periods; with other means for manually and bodily advancing or shifting another of the forms for each of a lesser number of writing periods; and with still other means for fixedly holding in place at least one of the forms during one of the writing periods.

Additional objects and other important advantages of the present invention will become more fully evident from the following detail description of the various instrumentalities employed to achieve the aforeindicated results and illustrated in one of their many possible embodiments for explanatory purposes in the accompanying drawings wherein:

Fig. 1 is a plan view of the machine in its presently preferred form, in accordance with the instant invention;

Fig. 2 is a front view thereof;

Fig. 3 is a side elevation seen from the right of Fig. 1;

Fig. 4 is a perspective view of the machine with some of its portions broken off and disclosing a few of many possible writing matter items or forms applicable for use with the machine;

Fig. 5 is an enlarged top view of one of the manually adjustable locating means for at least one of the writing forms;

Fig. 6 is an enlarged fragmental section taken approximately along line 6—6 of Fig. 4;

Fig. 7 is a section taken along line 7—7 of Fig. 5;

Fig. 8 is a section taken along line 8—8 of Fig. 5;

Fig. 9 is an enlarged section taken approximately along line 9—9 of Fig. 1, and disclosing a portion of the interior mechanism of the device;

Fig. 10 is a fragmental top view, partly in section, of the machine with the top removed and disclosing portions of the working mechanism therein;

Fig. 11 is a perspective detail view of one of the writing items, with its undersurface exposed, and adapted for use during a series of writing periods; and Fig. 12 is a perspective view of another writing item, also with its undersurface exposed, and adapted for a single writing operation.

Referring now specifically to the illustrations in the drawings, numeral 10 denotes a machine for making at one writing operation a multiplicity of records. It comprises a substantially fully closed cabinet 11, its body being made preferably from one piece of material, and is provided with an inclined top 12 from which extends a relatively short front panel 13, a higher back or rear panel 14, and two tapered end or side panels 15 and 15'. The bottom edges of the front, rear and side panels are preferably flanged inwardly, as shown at 16 in Figs. 9 and 10, and serve for the attachment of a removable bottom closure 17.

Over cabinet top 12, and adapted to normally completely cover the same, there is provided a cover-like element 18 hinged at its rear end at 19 to the elevated rear end of the cabinet. Element 18 is provided with side flanges 20 adapted to overhang the upper ends of the sides or end edges of the cabinet, said flanges serving as guides for element 18 to bring it into registry with the cabinet. The top member 12 has a plurality of small elevations 21, such as produced by means of rivets or any other suitable instrumentalities, and which elevations serve as spacing means between top 12 and cover-like element 18 when the latter overlies the cabinet top. In every other respect, however, top 12 presents a continuous, uninterrupted supporting surface over its entire area, with the exception of two small apertures near the edges of the cabinet, as will become apparent presently. Normally element 18 is adapted to repose upon elevations 21, but may be swung upwards and away from top 12, as shown in Fig. 3, to permit the insertion between the top and the element of one of the writing matter forms employed in conjunction with the device.

In element 18 are provided two aligned apertures 22 and 23 to render accessible for writing purposes one of the writing matter forms, in aperture 23, and several other superimposed forms in aperture 22, as will be explained presently. Aperture 22 is relatively long while aperture 23 is considerably shorter than aperture 22. These apertures extend transversely over top 12 of the cabinet, as may be clearly observed from Fig. 1, the top serving as support for all writing forms.

Offset relative to writing apertures 22 and 23 and disposed near the edges of element 18 are narrow oblong apertures 24 and 24' which register with corresponding apertures 25 and 25' provided in top 12 of the cabinet, see Figs. 4 and 9.

Secured to cover element 18 above the larger writing aperture 22 are two pairs of parallelly spaced cooperating fixed and manually movable writing-form-locating means indicated, respectively, at 26 and 26' and 27 and 27' in Figs. 1 to 8. Fixed locating means 26 and 26' comprise simple stationary pins, while movable locating means 27 and 27' constitute mobile pins extending from two individually guided sliding elements 28. The latter are in the form of short blocks 28' which are reduced in thickness along their sides, as at 29 in Fig. 8. The blocks are provided near one of their ends with retention apertures 29' for accommodating a detent element 30 in the form of a ball, see Figs. 7 and 8. Forcibly engaging ball 30 is a spring member 31 held in place by locating pin 27 or 27' extending into the body of their respective blocks 28'. Sliding elements 28 operate within guide frames 32 provided with slots 33 serving as guide means for the sliding elements. Guide frames 32 overlap with their interior edges the recessed or reduced edges 29 of slides 28. The areas of cabinet top 12 disposed beneath slots 33 of guide frames 32 serve as bases for the frames and are provided with perforations 34 which have preferably rounded upper edges and serve as temporary retention seats for detent balls 30.

Guide frames 32 are attached to the cover-like element 18 by means of screws, rivets or in any other suitable manner, but in the drawings the lowermost exterior attaching means for the guide frames take the form of stationary pins 26 and 26' serving as fixed locating means for some of the writing forms intended for use with this machine. It will be noted that the distance between fixed locating pins 26 and 26' is somewhat greater than the distance between movable locating pins 27 and 27'.

As will be clearly observed from Fig. 5, guide members 32 are provided with uniformly spaced line marks which are numbered one to fourteen. Some of these line marks are in alignment with the centers of apertures 34, while the upper two marks extend above these apertures. There are no line marks opposite the lowermost apertures. The distances between the line marks equal those between the apertures 34. Slides 28 are adapted to be manually shifted by means of pins 27 and 27' to any desired position and are held at such position by the engagement of balls 30 with any of the apertures 34. Thus pins 27 and 27' may be moved from their lowermost position near the bottom of slots 33 to the uppermost position near the top thereof. These pins are adapted to bodily move certain forms used with the machine to the desired successive positions during a certain number of writing periods, as will become presently evident.

*Mechanism*

Referring now to the operating mechanism within the cabinet, that instrumentality may be clearly observed from Figs. 9 and 10. In Fig. 9 the end or side wall 15 is shown to be reinforced by a plate 35. Projecting through the end walls 15 and 15' of the cabinet, seen in Fig. 10, are bearing members 36 in which is rotatably lodged an operating shaft 37, extending over the width of the cabinet and projecting beyond the sides thereof, and to which projecting shaft ends are secured hand knobs 37' and 37". Held by set screws or otherwise fixedly secured to the shaft are two aligned pin wheels 38 and 38'. These pin wheels comprise disc-like structures from which extend radially pins 39, the pins of both wheels being in alignment with each other. The upper portions of both wheels project through apertures 25 and 25' of the cabinet top and partly extend into apertures 24 and 24' of element 18.

Pivotally mounted on a stud 40, extending from reinforcing plate 35, is a detent lever 41, at the upper end of which is provided a pin-engaging ring 42 in the form of a ball bearing. This ring is adapted to forcibly engage the ends of any two adjacent pins 39 of pin wheel 38 so as to define and restrict the movement of both pin wheels and of the shaft in such a way that a certain number of pins of each wheel will be always retained at fixed position within apertures 25 and 25' and 24 and 24' of the cabinet top and of the cover-like element 18, respectively. Ring 42 is normally urged into its pin-engaging position by a tension spring 42', secured with one of its ends to a pin extending from plate 35, while its other end is connected to the lower lever arm of detent 41.

Extending through plate 35 and through side wall 15 of the cabinet is a pivot pin 43 lodged in a bearing hub 43' which projects from plate 35. Upon pin 43 there is mounted exteriorly to the cabinet a ratchet lever 44, the longer end of which terminates in an enlarged, depressible operating portion 45. From the shorter end 46 of the lever extends a pin 47 into the cabinet through a suitable slot 48 arranged in side wall 15 and plate 35. At the reduced end of pin 47 there is pivotally mounted a ratchet pawl 48; which has a pin-engaging end 49 and an abutment end 50. Ratchet lever 44 is normally held in its position shown in broken lines in Fig. 9 by a coil spring 51.

Extending from plate 35 into the path of abutment end 50 of pawl 48' is an abutment pin 52. A tension spring 53 mounted between plate 35 and the lower end 54 of pawl 48', normally urges end 49 of the pawl into an engaging position with the wheel pins, as indicated in broken lines in Fig. 9, when portion 45 of lever 44 is depressed. When that lever portion is released, shorter lever end 46 is forced to the bottom of slot 48, and end 50 of the pawl comes in contact with abutment pin 52, whereby the pawl is swung to its full line position, shown in Fig. 9, against the tension of spring 53. Thus when operating portion 45 of lever 44 is depressed and end 50 of the pawl is freed from abutment pin 52, spring 53 forces pawl end 49 into engagement with one of the wheel pins, and, when lever 44 completes its movement as it becomes fully depressed by its end 45, pawl end 49 causes pin wheel 38 to move through an arc equal to the distance between two adjacent pins. When lever 44 is released, it will assume its broken-line position and the pawl will revert to its full line position as shown in Fig. 9. Detent 41 holds pin wheels 38 against inadvertent movement, and through each operation of lever 44 the pin wheels as well as shaft 37 are moved forwards, that is in one direction, through an arc corresponding to the distance between two adjacent pins. However, shaft 37 may be moved non-automatically in either forward or backward directions by hand through the agency of hand knobs 37' and 37".

*Writing matter forms*

Referring to Figs. 4, 6, 11 and 12, these illustrations disclose some of the writing forms or writing matter items adapted for use in connection with the aforedescribed machine. Only four of such forms are indicated. It is of course self-understood that neither the number, the shape, the size nor the application of the forms to the machine are intended to restrict the present invention to such showing, but merely are designed to serve as explanatory aid.

In consulting Figs. 4 and 11 there is disclosed at 55 one of the writing forms intended to be used as exchangeable duplicating element intended to serve for a series of successive writing periods. This writing matter item comprises an elongated strip provided near its top edge with spaced perforations 56 and 57 which are adapted to be engaged by or slipped over fixed locating pins 26 and 26'. At the undersurface of the strip, shown exposed in Fig. 11, there will be observed a stripe 58 of a duplicating coating, such as a carbon or ink matter. Both ends of the strip are offset near the area in which the perforations appear and these offset ends are intended to be placed beneath the end edges of longer writing aperture 22 when the strip is held in place by pins 26 and 26'. In that position the duplicating coating of the strip extends centrally along and substantially over the entire length of aperture 22.

A second writing matter item is indicated at 59 in Fig. 4. That form comprises an elongated sheet divided by printing matter at both of its faces into two superimposed upper and lower major body portions. Each portion of the printing matter contains line columns, the lines being successively numbered, the numbers of the lines corresponding to the numbers provided along the edges of slots 33 of guide members 32 in which the adjustable locating pins 27 and 27' operate. Sheet 59 has two pairs of spaced perforations 60 and 61, adapted for engagement by pins 27 and 27' for the use of either the upper or the lower line column imprinted upon both faces of the sheet. When, for instance, pins 27 and 27' are placed to register with line marks 5 of guide slots 33, and the upper pair of perforations 60 is placed over the thus positioned pins, line 5 of the upper line column will become automatically located centrally within writing aperture 22 of cover-like element 18. Writing form 59 is intended to serve as a personal record of each employee in an establishment. Upon that form is entered, in addition to pertinent personal notations concerning the employee, all information pertaining to his earnings during one year.

As stated, the two superimposed line columns on each face of the sheet divide the latter into two major upper and lower body portions. Each line column is intended for a quarter-yearly earning period. The lines of each column are successively numbered, say from one to fourteen, and are designed to receive, in their numerical order, on each successive pay day the earning record of the employee for the preceding work or earning period. Since form 59 is to be handled during an entire year, it is preferably made from a sufficiently strong stock in the form of a filing card.

Adapted to repose on top of form 59, see Fig. 4, is a third form 62, shown in detail in Fig. 12. This form comprises an elongated sheet member provided with a pair of spaced perforations 63 near its upper corners, and at its undersurface there will be observed a duplicating coating 64 which is intended to make a visible impression upon form 59 during one of a succession of writing periods. Perforations 63 of sheet member 62 are intended to be engaged by fixed locating pins 26 and 26'. That form is adapted to be held stationary in position for a single writing period only, and is intended to represent either a statement of earnings, or a check in payment of the earnings of such employee for a single work or earning period terminating on a pay day.

Referring again to Fig. 1 and to Fig. 6, a fourth form 65 is shown supported by cabinet top 12 and covered by element 18, and is intended to move between these two instrumentalities. Form 65 is designed to serve as a general earning record of all employees in an establishment for a single work period ending at one pay day. It is preferably provided with a series of consecutively numbered lines, one line for each employee. The spacing of its lines corresponds to the spacing of the lines in form 59. Each of the lines of form 65 is intended to receive within the area of aperture 23 of element 18 the name of one of the employees, and the information as to his earnings for one payroll period within the area of aperture 22. Sheet 65 is marginally perforated, as at 66, the spacing of the perforations corresponding to the spacing of the lines imprinted on that form. The perforations 66 are adapted to be engaged by pins 39 of both pin wheels 38, and when these pin wheels are operated by either automatic actuating lever 44 or by hand knob 37' and 37'', the sheet is moved to desired positions. In Figs. 1 and 4 it will be observed that the smaller writing aperture 23 of element 18 is provided with a cut-out 67 at its left edge. That cut-out is intended to render visible the line numbers of form 65.

Obviously the fourth form 65 is of a substantial width since it has to extend practically to both side edges of the cabinet in order to facilitate the engagement of its perforations by pin wheels 38. Its length is determined by the number of lines to be imprinted upon the form. As stated and as may be observed from Figs. 4 and 6, form 65 is adapted to move between top 12 of the cabinet and cover-like element 18, and in order to provide sufficient space for such movement, element 18 rests against the aforedescribed spacer means 21 which are intended to prevent element 18 from impinging upon form 65 during the latter's movement.

*Operation*

In the use of the machine and of the forms outlined, the first step is the alignment of form 65 in respect to the pins of pin wheels 38. This is done by swinging cover-like element 18 upwards in the manner shown in Fig. 3 to facilitate the insertion of the form. When properly engaged at its perforations by pins 39 of the wheels, element 18 is swung downwards so that its flanges 20 overlap the side edges of the cabinet. Now form 55 is applied to be held in fixed position by placing its perforations 56 and 57 over fixed locating pins 26 and 26' so that its carboned undersurface 58 will overlie form 65. In order to more securely hold form 55 in position, its offset end edges are slipped beneath the side edges of longer writing aperture 22. Now form 59 is placed with its perforations 60 over manually adjustable locating pins 27 and 27'. Thereupon form 62 is fastened in place by the engagement of its perforation 63 with fixed locating pins 26 and 26'. Obviously its carboned undersurface 64 is turned downwards against form 59.

To start with the first lines on forms 65 and 59, the following steps are to be taken: Form 65 is adjusted by hand knob 37' or 37'' until its first line marked by numeral "1" appears in cut-out 67 of the shorter writing aperture 23. Adjustable locating pins 27 and 27' holding form 59 are then simultaneously moved down along their guides 32 to the line mark indicated by numeral "1." At those positions of forms 65 and 59 all four now superimposed forms are ready to receive the first of a successive number of writing impressions. The name of one of the employees is entered on line 1 of form 65 appearing within shorter writing aperture 23. Thereupon the amount of his earnings, deductions or any other information is written upon the topmost form 62 within a narrow area over a line which corresponds to and is aligned with the first lines of forms 59 and 65. Thus all of the information written upon form 62 is simultaneously impressed upon forms 59 and 65 through the medium of the duplicating stripes at the underfaces of forms 62 and 55.

For the next following writing period forms 62 and 59 are removed and replaced by new forms for the next employee. Meantime lever 44 is depressed once and released, during which operations the pin wheels are moved forwards through an arc corresponding to the spacing between two adjacent pins and also corresponding to the distance between two adjacent lines of form 65. Thus that form is moved to its second line position. The name of the next employee is now entered on the line portion within aperture 23, and his earning information is impressed upon forms 62 and 59. The same procedure follows for each of the employees in an establishment during one payroll period. For the next payroll period a new form 65 is employed and is operated in the manner described above, but all individual personal record forms 59 for each employee are set by adjustable locating pins 27 and 27' to their second position marked by numeral "2" on guides 32.

During the successive writing periods to which duplicating form 55 is subjected, its carbonized undersurface may be used up and therefore it may be required that that form be changed from time to time. Such replacing operation of form 55 may become tiresome, in which case other expedients may be resorted to. It is obvious that a relatively large duplicating sheet, such as a carbon paper, may be used directly over that portion of form 65 upon which the earning information of all employees for one payroll period is entered. Such duplicating sheet when placed flatly over form 65 beneath element 18 and is bound to move together with that form each time the latter is advanced by the operation of lever 44.

In the foregoing description a specific embodiment of the machine and specifically arranged writing matter items or forms were described, as adopted for use in connection with payroll accounting. It is quite obvious that the construction, size and mechanical equipment of the machine may have to be altered and that various changes and improvements may have to be incorporated therein in order to adapt the machine for other uses than those of payroll accounting.

Thus, for instance, a machine based upon the principle disclosed herein may find use in certain engineering, architectural or other industrial work, in which event the size and mechanical arrangement of the device would have to be altered. Such alterations may include a multiplicity of pin wheel instrumentalities with a corresponding number of automatic and non-automatic pin wheel actuating or propelling means, or a plurality of detents for the pin wheels, such as detent 41, or modified constructions of or more than one set of fixed and mobile form-locating means.

By the same token, while four specific forms have been illustrated and described for use upon the machine, their number, sizes and arrangement may have to be changed to meet other such requirements. It is therefore to be understood that while the foregoing description deals with a machine and forms for payroll accounting, the same principle involved in both that machine and such forms may be employed for many different uses, for which reason any changes, improvements or substitutions for the articles described herein are to be considered a part of this invention as defined in the annexed claims.

I claim:

1. In a machine of the character indicated including a cabinet with a slanting top and side walls, a cover element hinged at the higher end of the cabinet and adapted to normally overlay the top and having slots adjacent its side edges and having openings for exposing portions of a record sheet supported by the cabinet top beneath the cover; a mechanism for moving a record sheet over the top and under the cover for progressively exposing successive portions of the sheet through the cover openings, said mechanism comprising a shaft extending transversely through the cabinet beneath said slots and having its ends projecting beyond the side walls, hand knobs engaging the projecting shaft ends for manually operating the shaft, wheels secured upon the shaft and having circumferentially spaced pins extending radially from the peripheral faces of the wheels through and being movable in the slots and serving to shift the record sheet as the shaft is rotated, a spring-loaded detent in yieldable engagement with the ends of any two adjacent pins of one of the wheels to thereby restrict the movement of both wheels and of the shaft so that a certain number of pins of each wheel extending through the slots are retained in fixed position when the shaft is at stand-still, and operating means for the wheels and the shaft including a spring-loaded, pivotally supported ratchet lever disposed and operative exteriorly to the cabinet and having a normally elevated, depressible long and a shorter end, a slot provided in one of the cabinet side walls, the shorter lever end extending through the slot into the cabinet, a spring-loaded ratchet pawl pivotally associated with that shorter end of the lever and having a pin-engaging end and an abutment end, a fixed abutment within the cabinet extending into the path of the abutment end of the pawl, and being adapted, when engaged by said abutment end as the ratchet lever is released to assume its normal elevated position, to swing the pawl so that its pin-engaging end clears the wheel pins, said pin-engaging end of the pawl being thus adapted to alternately engage and release the pins of one wheel, one at a time, at each operation of said ratchet lever, thereby imparting a step by step turning movement to the wheels and the shaft.

2. In a machine according to claim 1, one of the side walls having an interior reinforcing plate, a stud extending from said plate for pivotally supporting said spring-loaded detent, the latter comprising a two-armed lever, a tension spring engaging one lever arm, a pin-engaging rotary ring having friction-reducing means and being mounted at its other arm, said ring constituting that portion of the detent which yieldably engages any two adjacent pins of one of the wheels.

3. In a machine according to claim 1, one of the side walls having an interior reinforcing plate, a bearing hub extending from the plate into the cabinet, a pivot pin lodged in the hub and operatively supports said ratchet lever, a coil spring engaging said pivot pin and serving for normally retaining the long, depressible end of the lever in elevated position, a slot provided in the plate for accommodating the shorter end of said ratchet lever and for facilitating its movement therein, said slot in the plate registering with the slot in the cabinet side wall.

4. In a machine according to claim 1, one of the side walls having an interior reinforcing plate, said fixed abutment, extending into the path of the abutment end of the ratchet pawl, being mounted in and projecting from the plate.

ELLIS A. LASKEY.

References Cited in the file of this patent

UNITED STATES PATENTS

| Number | Name | Date |
|---|---|---|
| 902,571 | Faverio | Nov. 3, 1908 |
| 2,095,904 | Baughan | Oct. 12, 1937 |
| 2,163,193 | Critchfield | June 20, 1939 |
| 2,198,580 | McNabb | Apr. 23, 1940 |
| 2,301,482 | Uhl | Nov. 10, 1942 |
| 2,344,453 | Payne | Mar. 14, 1944 |
| 2,439,537 | Zalkind | Apr. 13, 1948 |
| 2,451,467 | Bickel | Oct. 19, 1948 |
| 2,457,807 | Davidson et al. | Jan. 4, 1949 |
| 2,485,002 | Krueger | Oct. 18, 1949 |
| 2,485,513 | Straus | Oct. 18, 1949 |